US 008806581 B2

(12) United States Patent
Kiester et al.

(10) Patent No.: US 8,806,581 B2
(45) Date of Patent: *Aug. 12, 2014

(54) SECURE LAUNCHING OF BROWSER FROM PRIVILEGED PROCESS

(75) Inventors: W. Scott Kiester, Orem, UT (US); Cameron Mashayekhi, Salt Lake City, UT (US); Karl E. Ford, Highland, UT (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/366,831

(22) Filed: Feb. 6, 2012

(65) Prior Publication Data
US 2012/0137351 A1    May 31, 2012

Related U.S. Application Data

(63) Continuation of application No. 11/985,110, filed on Nov. 14, 2007, now Pat. No. 8,112,791.

(51) Int. Cl.
*H04L 29/06* (2006.01)
*G06F 21/00* (2013.01)

(52) U.S. Cl.
USPC .................................................. 726/4; 726/17

(58) Field of Classification Search
None
See application file for complete search history.

(56) References Cited

U.S. PATENT DOCUMENTS

| 6,981,277 | B1 | 12/2005 | Smith |
| 7,069,275 | B2 | 6/2006 | Salmen |
| 2004/0158720 | A1 | 8/2004 | O'Brien |
| 2005/0273866 | A1* | 12/2005 | Brown et al. ................... 726/28 |
| 2006/0041942 | A1 | 2/2006 | Edwards |
| 2006/0122904 | A1 | 6/2006 | Shafron et al. |
| 2007/0005951 | A1* | 1/2007 | Davis et al. ....................... 713/2 |
| 2009/0055642 | A1 | 2/2009 | Myers et al. |
| 2009/0070571 | A1 | 3/2009 | Neely |

OTHER PUBLICATIONS

Microsoft, "IWebBrowser2 Interface," http://msdn2.nnicrosoft.com/en-us/library/aa752127.aspx, Oct. 30, 2007, 1 page.
Microsoft, "GINA," http://msdn2.microsoft.com/en-us/library/ms721584.aspx, Oct. 30, 2007, 1 page.
Microsoft, "Winlogon and GINA," http://msdn2.microsoft.com/en-us/library/aa380543.aspx, Oct. 30, 2007, 1 page.
National Security Agency, "Security Policy Configuration," http://www.nsa.goy/selinux/papers/freenix01/nodel2.html, Oct. 30, 2007, 3 pps.
Wikipedia, "Winlogon," en.wikipedia.org/wiki/Winlogon, Oct. 30, 2007 3 pps.

* cited by examiner

*Primary Examiner* — Gilberto Barron, Jr.
*Assistant Examiner* — Malcolm Cribbs
(74) *Attorney, Agent, or Firm* — Fish & Richardson P.C.

(57) ABSTRACT

Methods and apparatus include securely launching a web browser from a privileged process of a workstation to minimize enterprise vulnerabilities. The workstation includes a restricted-capability web browser pointed toward a web server. An executable file is wrapped about the browser and imposes restrictions, such as preventing the writing to a registry or installing ActiveX controls. It also has functionality to prevent users from linking to web locations in other than an https protocol or following links beyond an original host. Upon indication of a forgotten password/credential, the restricted-capability web is launched browser toward a web server. Upon authentication of identity, the user changes their password/credential for later logging-on to the workstation, but in a capacity without the limited functionality or the imposed browser restrictions.

26 Claims, 5 Drawing Sheets

SECURE LAUNCHING OF BROWSER FROM PRIVILEGED PROCESS

This application claims priority and benefit as a continuation application of U.S. patent application Ser. No. 11/985,110 filed on Nov. 14, 2007, the entire disclosure of which is incorporated herein by reference.

FIELD OF THE INVENTION

Generally, the present invention relates to computing environments involving web browser usage in an enterprise environment. Particularly, it relates to securely launching a browser from a privileged process to minimize enterprise vulnerabilities. Features of the invention are of significance since new security vulnerabilities are discovered in most of the major browsers each week, month, quarter, etc. In a representative embodiment, a user account is deployed with limited functionality in browsing functionality. In another, an executable file imposes restrictions on browser capabilities. In still another, servers, eDirectories, https protocol, dynamic linked libraries and change of password/credentials are implemented as are computer program products and computing networks.

BACKGROUND OF THE INVENTION

Enterprises regularly require users to change their passwords or other credentials in order to log-in to applications or receive email or other services. Since this requirement is imposed quarterly, monthly, weekly, etc., users often forget their passwords/credentials. To assist the users, the prior art presents authentication questions that, when answered correctly, give the user hints about their passwords/credentials. They then use the hints to reconstruct the passwords/credentials in order to log-in. This authentication process, however, is deployed in such a way that the enterprise's system becomes vulnerable to rogue antics.

For example, web browsers are launched from privileged processes during log-in (e.g., launched from Winlogon) that ferry users to web servers for Q/A authentication sessions. In the event the servers are hacked, infected or otherwise compromised, the enterprise receives unnecessary exposure in the form of viruses, keystroke-logging programs, trojans, malware, etc. that naturally or consequentially infect enterprise services, systems, applications, etc., with malicious or other extraneous code. Intuitively, this represents a security compromise and should be eliminated, if possible.

Accordingly, there is need in the art of web browsers and system log-in technology to minimize enterprise vulnerability. In that many computing configurations already have web browsers and log-in software, it is further desirable in the art to leverage existing configurations by way of retrofit technology, thereby avoiding the costs of providing wholly new products. Taking advantage of existing frameworks, such as web browsers known by the names Internet Explorer, Mozilla Firefox, or Netscape Navigator, or log-in technology, such as the Novell Identity Manager (v. 3.5) software offering by Novell, Inc., or the Windows brand Winlogon, are other features that optimize existing resources. Any improvements along such lines should further contemplate good engineering practices, such as automation, relative inexpensiveness, stability, ease of implementation, high security, low complexity, flexibility, etc.

SUMMARY OF THE INVENTION

The foregoing and other problems become solved by applying the principles and teachings associated with the hereinafter-described secure launching of a browser from a privileged process. At a high level, methods and apparatus teach an arrangement of computing devices for helping users get a new password/credential for log-in, if previously forgotten, but not at the expense of exposing an enterprise to computing vulnerability.

In a representative embodiment, a user's workstation includes a limited user account that securely launches a web browser from a privileged process, but in a manner having insufficient rights to write to any part of the file system or registry. This prevents the installation of ActiveX controls, and makes it very difficult for trojans, viruses, or other malware to infect the system. By way of the browser, the user visits a web server that authenticates the user and enables a change of password/credential for later logging-in to the workstation without any limited functionality.

In more detail, features of the invention include a workstation with a web browser (pointed toward a web server via an entry in a registry) and a Logon API for the user to log-on to the workstation with their password/credential. An executable file, wrapped about the browser, imposes restrictions, such as preventing the writing to a registry or installing ActiveX controls. Also, the executable file prevents users from linking to web locations in other than an https protocol or following links beyond an original host. Upon indication of a forgotten password/credential, a dynamic linked library (DLL) logs onto a user account which invokes the executable file to launch the web browser in the https protocol. Upon reaching the web server, an eDirectory server is contacted to retrieve a list of challenge questions, which are presented to the user in the browser. Responses to the questions are sent back to the eDirectory server and, if accurate, the user is authenticated and allowed to change his password/credential. The new password/credential is then synched with an authentication server and the user logs into the workstation, but in a capacity without the limited functionality or the imposed browser restrictions.

In a computing system environment, the invention may be practiced with: a web browser accessible from the workstation for navigating web pages; a Logon window for a user to log-on to the workstation from a privileged process; an executable file wrapped about the web browser to impose restrictions on capabilities of the web browser; a registry configured to be read by the executable file, whereby the registry stores a location of a web server for pointing the web browser toward upon launch; a user account on the workstation with limited functionality; and a DLL that queries the user regarding whether they forgot their password/credential for log-in. If so, the user affirmatively indicates this and the DLL logs onto the user account thereby invoking the executable file to launch the web browser toward the web server including forcing the web browser to use an https protocol as part of the imposed restrictions. Upon authentication of an identity of the user via the web browser, the user can change their password for later logging-on to the workstation via the Logon window in a capacity without the limited function of the user account and the imposed restrictions on capabilities of the web browser.

Computer program products are also disclosed. For instance, a product available as a download or on a computer readable medium has components to undertake some or all of the foregoing notions of the computing system environment.

These and other embodiments of the present invention will be set forth in the description which follows, and in part will become apparent to those of ordinary skill in the art by reference to the following description of the invention and referenced drawings or by practice of the invention. The claims, however, indicate the particularities of the invention.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE ILLUSTRATED EMBODIMENTS

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical, electrical, arrangement, software and/or other changes may be made without departing from the scope of the present invention. In accordance with the present invention, methods and apparatus for securely launching a browser from a privileged process are hereinafter described.

Figure 1:
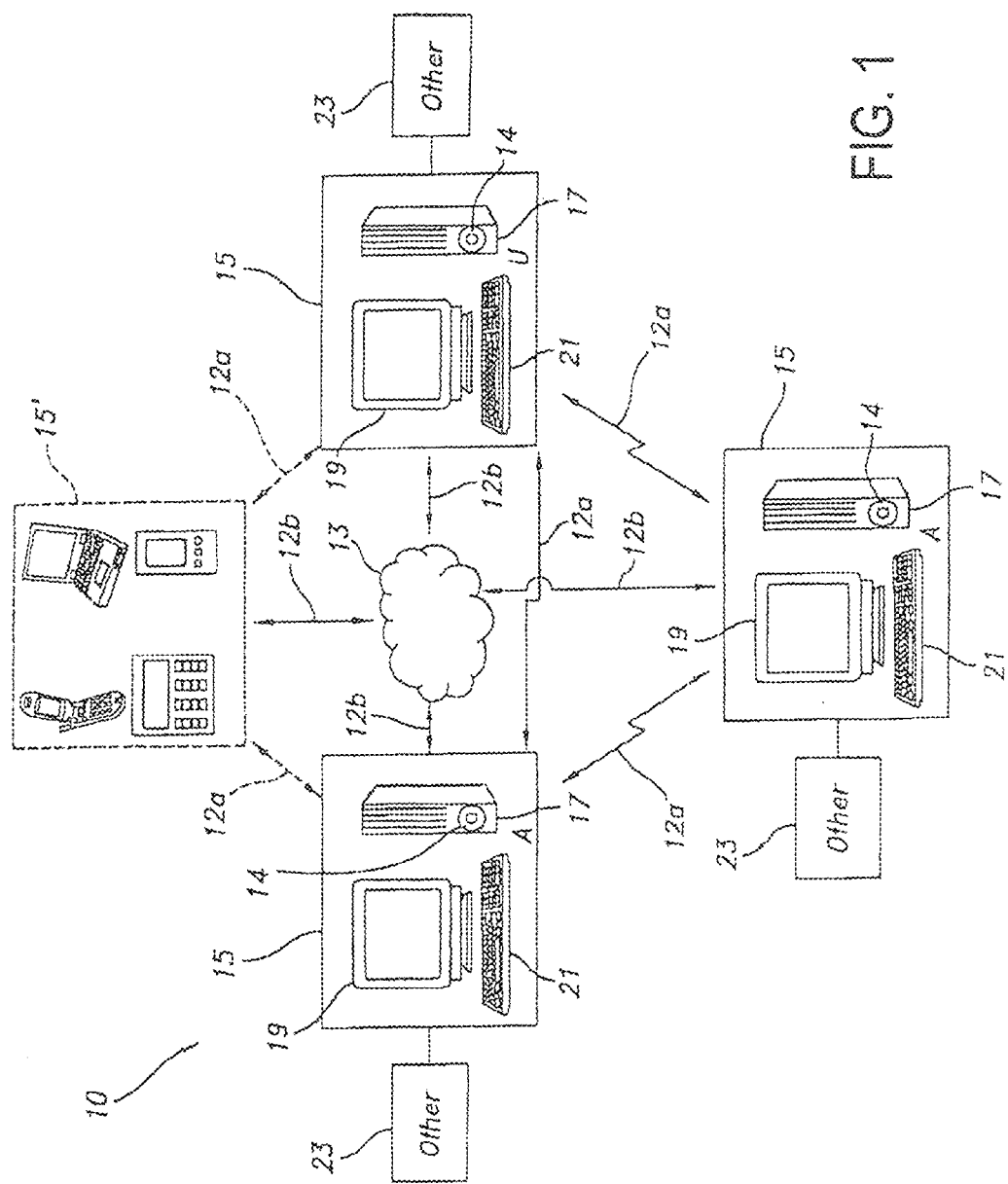
FIG. 1 is a diagrammatic view in accordance with the present invention of a representative computing environment for securely launching a browser from a privileged process.

With reference to FIG. 1, a representative computing environment 10 for practicing the invention includes one or more computing devices 15 or 15', per user workstations of an enterprise, arranged as individual or networked physical or virtual machines, including clients or hosts arranged with a variety of other networks and computing devices. In a traditional sense, an exemplary computing device typifies a server 17, such as a grid or blade server. Alternatively, it includes a general or special purpose computing device in the form of a conventional fixed or mobile computer 17 having an attendant monitor 19 and user interface 21. The computer internally includes a processing unit for a resident operating system, such as DOS, WINDOWS, MACINTOSH, VISTA, UNIX, and LINUX, to name a few, a memory, and a bus that couples various internal and external units, e.g., other 23, to one another. Representative other items 23 include, but are not limited to, PDA's, cameras, scanners, printers, microphones, joy sticks, game pads, satellite dishes, hand-held devices, consumer electronics, minicomputers, computer clusters, main frame computers, a message queue, a peer machine, a broadcast antenna, a web server, an AJAX client, a grid-computing node, a peer, a virtual machine, a web service endpoint, a cellular phone, or the like. The other items may also be stand-alone computing devices 15' in the environment 10 or the computing device itself.

In either, storage devices are contemplated and may be remote or local. While the line is not well defined, local storage generally has a relatively quick access time and is used to store frequently accessed data, while remote storage has a much longer access time and is used to store data that is accessed less frequently. The capacity of remote storage is also typically an order of magnitude larger than the capacity of local storage. Regardless, storage is representatively provided for aspects of the invention contemplative of computer executable instructions, e.g., software, as part of computer program products on readable media, e.g., disk 14 for insertion in a drive of computer 17. Computer executable instructions may also be available as a download or reside in hardware, firmware or combinations in any or all of the depicted devices 15 or 15'.

When described in the context of computer program products, it is denoted that items thereof, such as modules, routines, programs, objects, components, data structures, etc., perform particular tasks or implement particular abstract data types within various structures of the computing system which cause a certain function or group of functions. In form, the computer product can be a download or any available media, such as RAM, ROM, EEPROM, CD-ROM, DVD, or other optical disk storage devices, magnetic disk storage devices, floppy disks, or any other medium which can be used to store the items thereof and which can be assessed in the environment.

In network, the computing devices communicate with one another via wired, wireless or combined connections 12 that are either direct 12a or indirect 12b. If direct, they typify connections within physical or network proximity (e.g., intranet). If indirect, they typify connections such as those found with the internet, satellites, radio transmissions, or the like, and are given nebulously as element 13. In this regard, other contemplated items include servers, routers, peer devices, modems, T1 lines, satellites, microwave relays or the like. The connections may also be local area networks (LAN) and/or wide area networks (WAN) that are presented by way of example and not limitation. The topology is also any of a variety, such as ring, star, bridged, cascaded, meshed, or other known or hereinafter invented arrangement.

Figure 2:
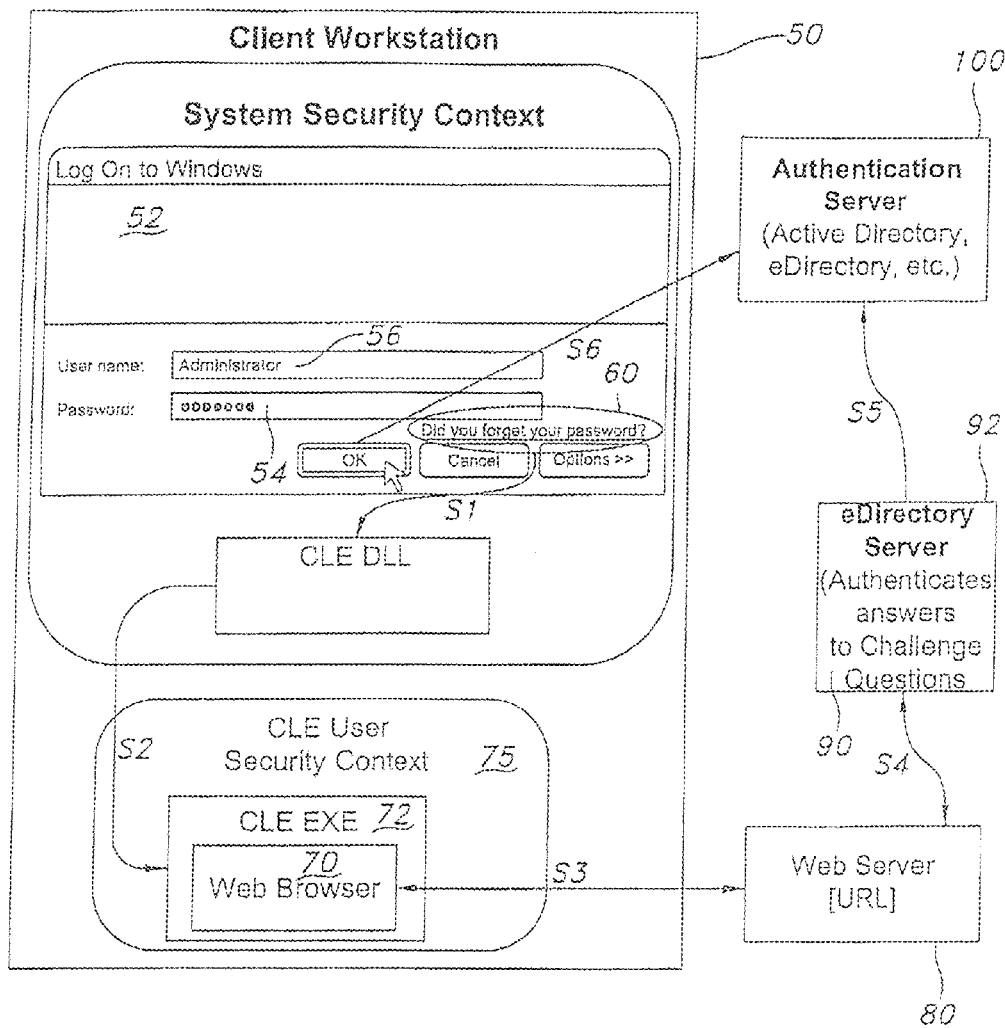
FIG. 2 is a diagrammatic view and flow chart in accordance with the present invention for securely launching a browser from a privileged process.

With the foregoing representative computing environment as backdrop, FIG. 2 teaches methods and apparatus for helping users get a new password/credential for log-in, if previously forgotten, but not at the expense of exposing an enterprise to computing vulnerabilities. Preliminarily, however, a client login extension will sometimes be used herein according to the acronym CLE. Similarly, a dynamic linked library will be referred to as a DLL, while an executable file will be referenced as an EXE.

Turning to the figure, a client workstation 50 includes a dialog box or Logon window 52 for entering a password or other credential, along with a user name 56, to access applications, services, programs, etc. of the workstation 50, as is well known. To the extent the user forgets their password, they are queried 60, such as by placement of a "Did you forget your password?" link. Upon the user affirmatively indicating their forgetting, the DLL of the CLE (or CLE DLL, for nomenclature purposes) is invoked.

At 70, the workstation also includes a web browser, such as Internet Explorer, Mozilla's Firefox, or Netscape's Navigator, to name a few. As is typical, the browser allows the user to navigate web pages, such as are found on the Internet. Surrounding the web browser is an executable file (EXE) 72 that "wraps" the browser to "lock down" or control its capabilities or behavior and implement certain items described below. In the context hereafter, this executable is referenced as the CLE EXE. Also, it is preferably a COM container and invokes the Internet Explorer form of the browser through the known IWebBrowser2 control. During use, the following representative steps (S) occur:

S1. The user clicks the "Did you forget your password?" link in the GINA (i.e., Graphical Identification aNd Authentication that is generally known as a replaceable DLL component that is loaded by the Winlogon executable. The GINA implements the authentication policy of the interactive logon model and undertakes the identification and authentication of user interactions.). This invokes the CLE DLL.

S2. The CLE DLL launches the CLE EXE 72 process in a secure process. This process runs or executes with the credentials and privileges of a CLE user account, which is a limited account with just enough rights to run the web browser.

S2.1 In more detail, the CLE DLL logs in as the user of the limited user account. In one embodiment, the CLE DLL uses MS-CAPI's (Microsoft's Cryptography API, which is available in versions of Windows that are currently supported by Microsoft) secure random number generator to create a random password.

S2.2. The CLE DLL checks to see if the CLE user account with limited functionality already exists on the workstation 50. If it does, then its existing password is changed to match the created random password generated in step S2.1. If it does not, on the other hand, then the CLE user account is created on-the-fly with the created random password from step S2.1.

S2.3. In either event, the CLE DLL logs in as the user of the limited user account (e.g., the CLE User 75) using the Windows LogonUser API. In turn, the API returns an access token for the CLE User.

S2.4. Next, the CLE DLL grants the CLE User rights to the Winlogon desktop (i.e., Winlogon is the process which contains the Windows GINA. This process runs as the Windows "System" (a.k.a. LocalSystem) account, which has rights to perform any operation on the workstation 50. Also, a Windows system typically has at least two desktops: one for Winlogon, and one for each user currently logged-in to the system. The Winlogon desktop is the desktop on which the GINA executes. The Winlogon desktop is visible when no one is logged into the workstation, and when the workstation is locked.). The CLE User is granted enough rights to display a window on their computing display for running or using the web browser 70.

S2.5. The CLE DLL calls the Windows CreateProcessAsUser API to invoke the CLE EXE with the CLE User's access token from step S2.3.

S3. The CLE EXE 72 invokes the web browser 70, e.g., Internet Explorer, via the IWebBrowser2 COM control, and imposes various security restrictions on the capabilities of the browser.

S3.1. The CLE EXE 72 starts the browser 70 toward a web location, e.g., URL, that it reads from the registry. During the time of installation, the URL is specified by a person such as a system administrator. The URL points to a web server 80 that will authenticate the identity of the user, such as by way of Challenge/Response questions, in order to eventually allow the user to change his earlier-forgotten password. Examples of challenge/response questions are known in the art and include name, address, age, employee identification number, mother's maiden name, etc.

S3.2. The CLE EXE 72 forces the embedded web browser 70 to use the https protocol (https: Hyper-Text Transfer Protocol Secure—the standard web http protocol running over an SSL-encrypted connection).

Also, it is preferred that as part of the https protocol, the web server 80 presents an X.509 certificate, containing, for instance, the host name of the web server in a subject category, and a signature by a trusted Certificate Authority (CA). In turn, this prevents an attacker (that has compromised a local DNS server, or that has access to the local network) from spoofing the web server 80 and collecting answers to challenge questions 90.

S3.3. The CLE EXE 72 prevents the web browser 70 from loading anything from a link that does not use the https protocol.

S3.4. The CLE EXE 72 prevents the web browser 70 from following links to hosts other than the original host. (In other words, all web pages, images, etc. must be loaded from the same web server 80.)

S3.5. Because the CLE EXE 72 is running as the CLE User 75, it has few privileges. In one embodiment, it does not have sufficient privileges to write data to the local disk (no data may be cached, so there is no chance of challenge questions or responses ending up in a local file). Furthermore, the browser cannot write to the Windows registry. As before, this prevents the installation of ActiveX controls, and makes it very difficult for trojans, viruses, or other malware to infect the system.

S4. The web server 80 contacts an eDirectory server 92 to get a list of challenge questions 90. These questions are relayed to the workstation 50 and presented to the user in the web browser 70 for responses. The responses are then sent back to the eDirectory server 92. If the responses are accurate, or authenticate the user's identity, the user is enabled to change his forgotten password and the web server presents the user with a page for undertaking this.

S5. The web server receives the new password and writes it to the eDirectory. The Novell Identity Manager, for example, will synchronize the new password with the user's authentication server 100. (If the user is using the Microsoft GINA, then the authentication server is probably a Microsoft Active Directory server. If the user is using a Novell GINA (not shown), then it is probably an eDirectory server.)

S6. The user closes the web browser window and enters his new password into the password field 54 on the GINA. The user logs into the workstation 50 with his new password and does so in a capacity without the limited functionality of the limited user account.

Figure 3:
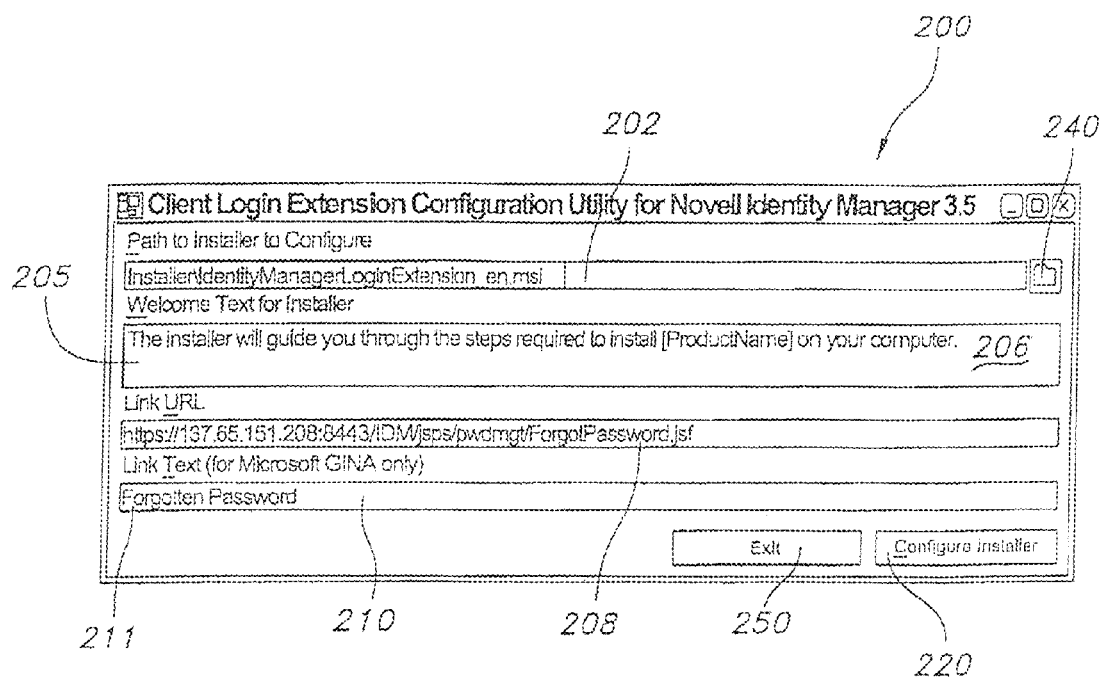
FIGS. 3-5 are diagrammatic views in accordance with the present invention for configuring a client login extension.
Figure 4:
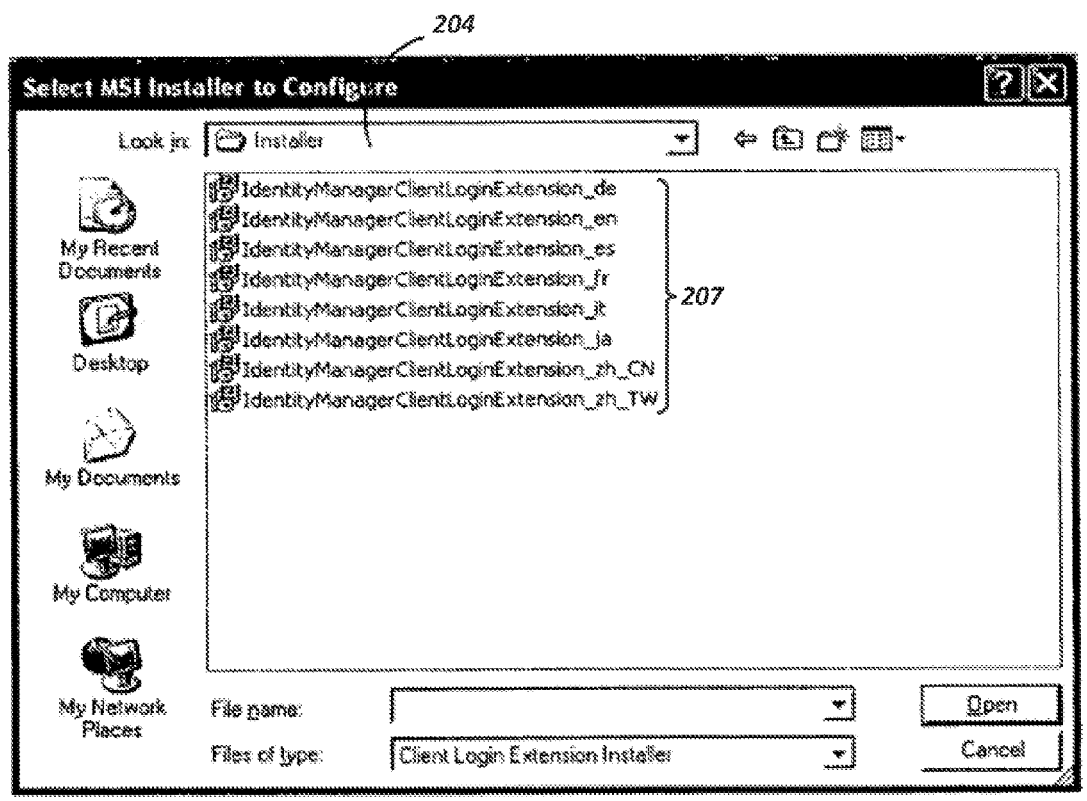
Figure 5:
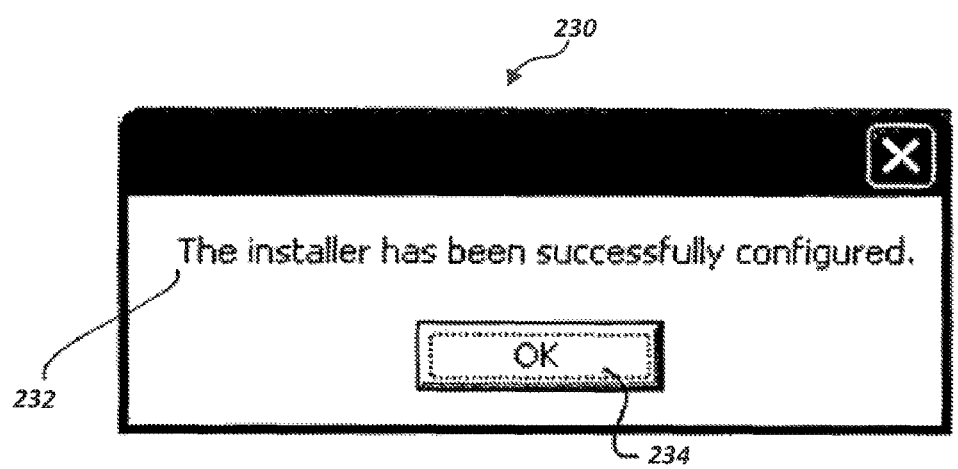

With reference to FIGS. 3-5, an alternate embodiment of the CLE contemplates the foregoing with Novell's GINA, and the following description is excerpted from the Internet at the location given as:
http://www.novell.com/documentation/idm35/admin/index.html?page=/documentation/idm35/admin/data/b9jptys.html.
Using the Client Login Extension (CLE) Configuration Utility to Configure the Client Login Extension MSI Files 1. Click the Client Login Extension Configuration utility for Novell Identity Manager 3.5 shortcut to launch the Client Login Extension Configuration utility. Or, double-click the: ClientLoginExtensionConfigurationUtility.exe file to launch the utility. In either event, it will appear as 200.

At 202, the Path to Installer to Configure option shows the path to the English version of the Client Login Extension installer file being configured. Whenever this text box contains a path to a valid MSI file, the utility automatically opens the file, populates the other controls with the information it contains, and enables the Configure Installer button.

2. (Optional) If administrators desire another language, they are to click the Browse button to select a Client Login Extension installer file 207 in a different language. By default, the Browse button opens into the Installer subfolder 204 in the installation folder and displays all files that match the Client Login Extension Installer pattern.

3. Modify the information 205 in the Welcome Text for Installer 206, or keep the information as it is presented. In one embodiment, the information in the text box 206 is displayed in the Welcome screen of the Client Login Extension. The string [ProductName] displays as "Client Login Extension for Novell Identity Manager 3.5."

4. Specify the URL (Link URL 208) that the Client Login Extension restricted-function browser 70 (FIG. 2) uses to connect to the User Application's Forgotten Password page. It can be a DNS name or an IP address. An representative example URL using a DNS name that links to the Forgotten Password page is:
https://hostname:8443/IDM/jsps/pwdmgt/ForgotPassword.jsf.

This can also be configured to access the external password WAR. To do this, see Chapter 5.8.4, "Accessing the External Password WAR," in the Identity Manager 3.5 Installation Guide.

As an important note, there needs to be a valid URL pointing to the User Application's Forgotten Password page; otherwise, the client connection fails and there might not be any log-in available through the workstation 50. For more information, see Section 8.5.1, Troubleshooting, in the Identity Manager 3.5 Installation Guide.

5. If there exists workstations that are using the Microsoft GINA, the installer should specify the text at 210 to be displayed on the link to the restricted browser that the Client Login Extension uses. The default text is "Forgotten Password" 211. The text for the button in the Novell Client is provided by the Novell Client and cannot be changed here.

6. After all of the information in 200 is filled-in, the installer should click "Configure Installer" 220 to write the new configuration settings to the selected Client Login Extension file. A window 230 and message 232 appear.

7. The installer should click OK 234 to close the confirmation message.

8. The Client Login Extension Configuration utility remains open, allowing the configuration of another Client Login Extension MSI file in a different language. To accomplish this, the installer clicks the Browse button 240 to the right of the Path to Installer to Configure option 202, and selects another language. They configure another .msi file by following Steps 2 through Step 7.

It should be noted, however, that localized Client Login Extension MSI files for the more common languages are delivered with the configuration utility in the Installers folder 204 and each localized installer should be configured individually.

To localize the Client Login Extension MSI files for languages other than those delivered with the Client Login Extension, see Section 8.3.1, in the Identity Manager 3.5 Installation Guide, entitled Localizing Client Login Extension Files for Other Languages.

9. To close the Client Login Extension Configuration utility for Novell Identity Manager 3.5 window, the installer clicks Exit 250.

As a note, the Client Login Extension MSI file cannot be run while it is open in the Client Login Extension Configuration utility.

Localizing Client Login Extension Files for Other Languages

To localize the Client Login Extension for languages other than those delivered with the Client Login Extension Configuration utility, the installer can use Orca to directly edit the content of the MSI database (IdentityManagerClientLoginExtension.msi). Orca (Orca.exe), as is known, is a database table editor for creating and editing Windows Installer packages. It is available in the Windows SDK Components for Windows Installer Developers.

The text to be localized for IdentityManagerClientLoginExtension.msi is located in the following table.

TABLE 1

Text Needed to Localize

| Table | Column | Comments |
|---|---|---|
| Control | Text | |
| Dialog | Title | |
| Directory | DefaultDir | Put text after "\|". |
| Launch Condition | Description | |
| Property | Value | Only ProductName, Manufacturer, ARPCONTACT, and VSDVERSIONMSG. |
| RadioButton | Text | |
| Registry | Value | set LogFile, LinkURL, LinkText, PasswordComplexityText, and LoginExtDesc to defaults for the configuration utility. |
| Shortcut | Name | Put text after "\|". |
| Shortcut | Description | If not null. |
| UIText | Text | |

As an installation warning, the installer should only translate the user interface text. For example, they should not translate text that is surrounded by square brackets ([xxxx]), or is in mixed case (XxxXxxXxx). Modifying these property names and identifiers, however, breaks the installer.

To localize the Client Login Extension MSI file to a new language, use the following:

1. Copy IdentityManagerClientLoginExtension.msi to IdentityManagerClientLoginExtension_xx.msi, where xx identifies the new language (locale).

2. Open IdentityManagerClientLoginExtension_xx.msi in Orca.exe, edit the tables and columns as they are listed in Table 1 to insert the localized text, then save and close the file.

3. Open IdentityManagerClientLoginExtension_xx.msi with the Client Login Extension Configuration utility (ClientLoginExtensionConfigurationUtility.exe), review the default values, make any modifications if needed, then click Configure Installer. As a note, Step 3 is required, even if the default values that set in the Registry table do not need modification. The Client Login Extension Configuration utility makes additional changes that enable the Client Login Extension MSI file.

In any embodiment, certain advantages and benefits over the prior art should be readily apparent. For example, methods and apparatus teach an arrangement of computing devices for helping users get a new password/credential for log-in, if previously forgotten, but not at the expense of exposing an enterprise to computing vulnerability. Specific advantages include, but are not limited to: 1) the CLE creates a new user on the system (referred to as the CLE User) and gives this user the minimum set of rights required to run a web browser, but such is fewer than those of a typical user created without administrative privileges; 2) the CLE generates a random password for the CLE User and logs in as the CLE User. The CLE also grants the CLE User explicit rights to display a window on the desktop alongside the GINA (Graphical Information aNd Identification interface) window; 3) the CLE launches a web browser process as the CLE User and the web browser only has the rights of the CLE User. Since the CLE User cannot write to the file system, registry, or virtually any other part of the system, the browser cannot write to these parts of the system, either. This makes it very difficult for a virus downloaded from a malicious web-site to infect the system; and 4) the creation of the CLE user can occur "on the fly" at runtime or during installation.

In alternate embodiments, it is a feature that the foregoing methods could be used to launch any process from the GINA, not just a web browser. In such instances, it would provide advantage for any process that needs to access the network or run untrusted code. Also, while the above solutions focus on Windows brand systems, it could be applied to other operating systems, such as Linux.

Finally, one of ordinary skill in the art will recognize that additional embodiments are also possible without departing from the teachings of the present invention. This detailed description, and particularly the specific details of the exemplary embodiments disclosed herein, is given primarily for clarity of understanding, and no unnecessary limitations are to be implied, for modifications will become obvious to those skilled in the art upon reading this disclosure and may be made without departing from the spirit or scope of the invention. Relatively apparent modifications, of course, include combining the various features of one or more figures with the features of one or more of other figures.

The invention claimed is:

1. A computing device, comprising:
one or more hardware processors configured to implement:
a web browser;
a user account with limited-functionality on the computing device, configured for imposing restrictions on capabilities of the web browser, where the restrictions on capabilities of the web browser are imposed by an executable file wrapped about the web browser; and
a dynamic linked library configured to query a user as to whether the user forgot a password or other credential to log-on to the computing device and to log onto the user account with limited-functionality to launch the restricted-capability web browser toward a web server.

2. The computing device of claim 1, wherein the limited-functionality user account is configured to force the web browser to use an https protocol as part of the imposed restrictions.

3. The computing device of claim 2, further including a registry configured to be read by the executable file, the registry storing a location of the web server for pointing the restricted-capability web browser toward upon launch.

4. The computing device of claim 1, further including a logon window for a user to log-on to the computing device from a privileged process.

5. The computing device of claim 1, further including a directory server communicating with the web server to authenticate the identity of the user.

6. The computing device of claim 5, further including an authentication server communicating with the directory server, the authentication server to synch a new user password with the workstation.

7. The computing device of claim 2, wherein the dynamic linked library, the executable file and the web browser reside on the computing device.

8. A computer program product stored on a non-transitory computer readable medium of a computing device, comprising:
a first component configured to enable the creation of a limited-functionality user account on the computing device on-the-fly or earlier upon installation by a system administrator; and
a second component having a dynamic linked library configured to query a user as to whether the user forgot a password or other credential for logging-on to the computing device and, upon the user affirmatively indicating forgetting the password or other credential, to log onto the limited-functionality user account to launch a restricted-capability web browser toward a web server; and a third component having an executable file configured to wrap about the web browser to impose the restrictions on capabilities of the web browser.

9. The computer program product of claim 8, wherein the second component dynamic linked library is configured to log onto the limited-functionality user account and invoke the executable file to launch the restricted-capability web browser.

10. The computer program product of claim 9, wherein the second component dynamic linked library is further configured to force the restricted-capability web browser to use an https protocol as part of the imposed restrictions on capabilities of the web browser.

11. The computer program product of claim 8, further including a fourth component configured to prevent the user from linking to a web location in other than the https protocol or following links to hosts other than the web server and/or to prevent the web browser from writing to a registry or installing ActiveX controls.

12. In a computing system environment having pluralities of computing devices arranged for an enterprise, a method of securely launching a web browser from a privileged process of a computing workstation of a user to minimize vulnerabilities to the enterprise, comprising:
creating a limited-functionality user account for use via the computing workstation;
querying the user as to whether the user forgot a password or other credential for logging on to the workstation; and
upon receipt of the user affirmatively indicating the foregtting, logging onto the created limited-functionality user account to launch a restricted-capability web browser toward a web server whereby, upon authentication of an identity of the user via the restricted-capability web browser, the user can change the password or other credential for later logging-on to the workstation in a capacity without the limited function of the created user account and the imposed restrictions on capabilities of the web browser
wherein the logging onto the limited-functionality user account invokes an executable file wrapped about the web browser to impose the restrictions on capabilities of the web browser.

13. The method of claim 12, further including forcing the restricted-capability web browser to use an https protocol.

14. The method of claim 13, further including preventing the user from linking to a web location in other than the https protocol or following links to hosts other than the web server at a time when the created user account with limited function is being used.

15. The method of claim 12, further including preventing the web browser from writing to a registry or installing ActiveX controls at a time when the created limited-functionality user account is being used.

16. The method of claim 12, wherein the invoking the executable file to launch the web browser further includes invoking the web browser through an IWebBrowser2 control.

17. The method of claim 12, wherein the creating the limited-functionality user account-occurs on-the-fly or earlier during installation by a system administrator.

18. The method of claim 17, further including creating a random password and, if the creating the user account occurred said on-the-fly, creating the user account with the created random password.

19. The method of claim 17, further including creating a random password and, if the creating the user account occurred said earlier during installation by the system administrator, changing a first password of the created user account to that of the created random password.

20. The method of claim 12, wherein the logging onto the created user account further includes using a dynamic linked library for the invoking the executable file to launch the web browser toward the web server.

21. The method of claim 20, wherein the dynamic linked library calls a CreateProcessAsUser API for the invoking the executable file to launch the web browser toward the web server.

22. The method of claim 20, wherein the logging onto the created user account further includes logging onto the dynamic linked library from a LogonUser API.

23. The method of claim 13, wherein the forcing the web browser to use the https protocol further includes receiving an X.509 certificate from the web server including a host name of the web server in a subject category and a signature from a Certificate Authority.

24. A system comprising:
a web server;
a computing workstation for accessing a web browser;
memory storing instructions, which, when executed by one or more processors in the computing workstation, causes the one or more processors to perform operations comprising:

configuring a limited-functionality user account on the computing workstation to impose restrictions on capabilities of the web browser, where the restrictions on capabilities of the web browser are imposed by an executable file wrapped about the web browser;

configuring a dynamic linked library to, upon a user affirmatively indicating forgetting a password or other credential, log onto the limited-functionality user account to launch the restricted-capability web browser toward the web server; and whereby the user can change the password or other credential for later logging-on to the workstation in a capacity without the limited-functionality user account and the restricted-capability web browser.

25. The system of claim 24, wherein the limited-functionality user account is configured to force the web browser to use an https protocol as part of the imposed restrictions.

26. The system of claim 25, further including a registry configured to be read by the executable file, the registry storing a location of the web server for pointing the restricted-capability web browser toward upon launch.

\* \* \* \* \*